United States Patent
Tang et al.

(10) Patent No.: US 9,231,678 B2
(45) Date of Patent: Jan. 5, 2016

(54) METHOD AND APPARATUS FOR PRECODING IN A TWO TRANSMIT ANTENNA CLOSED-LOOP MIMO FIXED WIRELESS BACKHAUL NETWORK

(71) Applicant: BLiNQ Wireless Inc., Ottawa (CA)

(72) Inventors: Taiwen Tang, Ottawa (CA); Ahikam Aharony, Ottawa (CA); Ho Ting Cheng, Stittsville (CA); Jeroen Stroobach, Kanata (CA)

(73) Assignee: BLiNQ Wireless Inc., Ottawa, Ontario ( * ) Notice: Subject to any disclaimer, the term of this patent is extended or adjusted under 35 U.S.C. 154(b) by 0 days.

(21) Appl. No.: 14/215,798

(22) Filed: Mar. 17, 2014

(65) Prior Publication Data
US 2015/0263799 A1    Sep. 17, 2015

(51) Int. Cl.
*H04L 27/28* (2006.01)
*H04B 7/04* (2006.01)
*H04L 25/03* (2006.01)

(52) U.S. Cl.
CPC ........ *H04B 7/0456* (2013.01); *H04L 25/03904* (2013.01)

(58) Field of Classification Search
CPC ... H04B 7/0417; H04B 7/0639; H04B 7/0456
USPC .................................................. 375/260, 267
See application file for complete search history.

(56) References Cited

U.S. PATENT DOCUMENTS

| | | | |
|---|---|---|---|
| 7,676,007 B1 * | 3/2010 | Choi et al. | 375/347 |
| 7,961,802 B2 | 6/2011 | Li et al. | |
| 8,165,241 B2 | 4/2012 | Lin et al. | |
| 8,320,283 B2 | 11/2012 | Kim | |
| 2014/0307702 A1 * | 10/2014 | Mese et al. | 370/330 |

OTHER PUBLICATIONS

N. Khaled et al., entitled "Interpolation-based multi-mode precoding for MIMO-OFDM systems", Proc. EUSIPCO 2005.

* cited by examiner

*Primary Examiner* — Michael Neff
*Assistant Examiner* — David S Huang
(74) *Attorney, Agent, or Firm* — Ridout & Maybee LLP

(57) ABSTRACT

A method and system is disclosed for precoding in a two transmit antenna MIMO system, for example, a wireless backhaul network. The method only uses the first column of the 2×2 precoder as the feedback information. When the feedback information is available to the transmitter, the transmitter performs an interpolation and reconstruction procedure to obtain the precoder matrix for each subcarrier. The method offers no significant loss in performance, with reduced computational complexity and feedback overhead compared to conventional known matrix representation methods.

5 Claims, 5 Drawing Sheets

Fig. 2  Precoding in CSC PHY-Transmitter

Fig. 3    Precoding in CSC PHY-Receiver

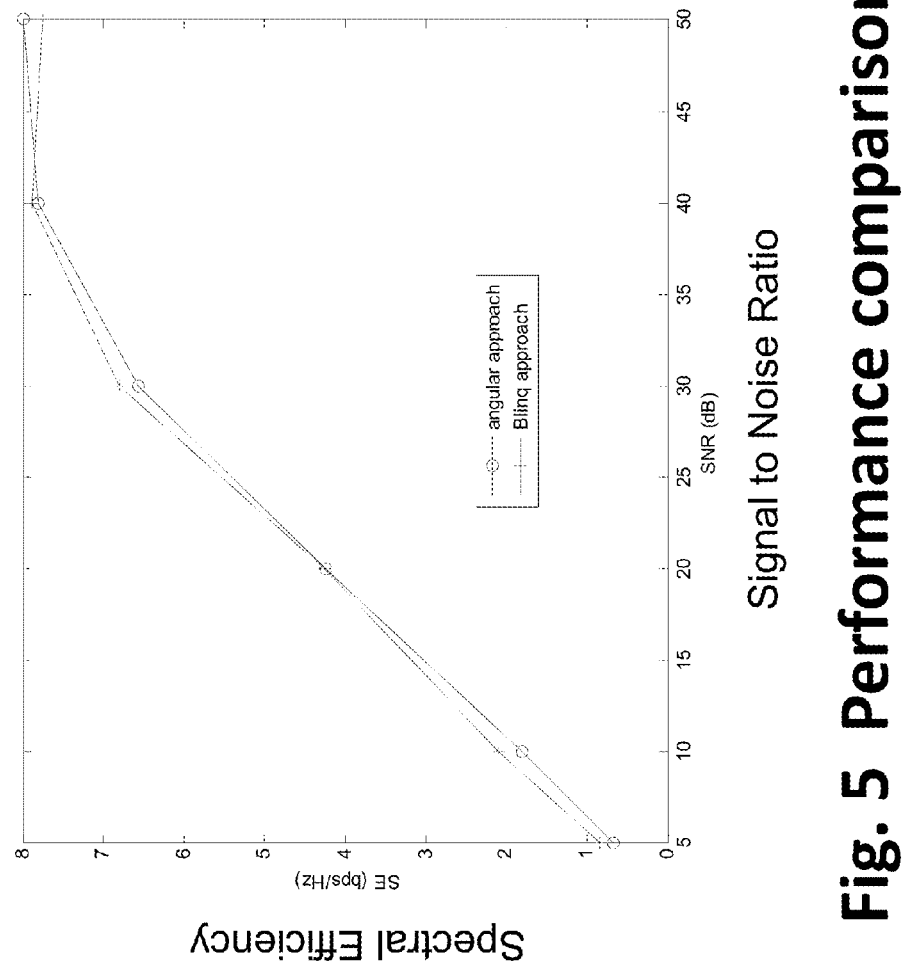
Fig. 5 Performance comparison

METHOD AND APPARATUS FOR PRECODING IN A TWO TRANSMIT ANTENNA CLOSED-LOOP MIMO FIXED WIRELESS BACKHAUL NETWORK

CROSS-REFERENCE TO RELATED APPLICATIONS n/a

TECHNICAL FIELD

This invention relates generally to Multiple Input Multiple Output (MIMO) technology in wireless networks, and particularly to a system and method for precoding in two transmit antenna closed-loop MIMO wireless networks, such as wireless backhaul networks.

BACKGROUND

In closed-loop MIMO systems, channel state information is transmitted from a receiver to a transmitter. The transmitter may then use the transmit channel state information for beam forming, i.e. for combining or separating spatial streams of a transmitted signal in a multiple transmit antenna system. However, communications bandwidth is consumed to transmit current channel state information, reducing overall data throughput. It is desirable to reduce the bandwidth used for feedback of channel state information.

In general, for a system with a plurality of N transmit and N receive antennas, the current channel state information may be represented by a N×N unitary beamforming matrix V, determined using a singular value decomposition (SVD) algorithm. It is required that the receiver transmits information for each entry of the beamforming matrix back to the transmitter. Transmitting this channel state information consumes bandwidth that might otherwise be used for data traffic.

Precoding is a closed-loop technique that is used to increase the spectrum efficiency of MIMO wireless networks. The optimum precoder for the frequency flat channel of a point-to-point MIMO link is the right unitary matrix of the singular value decomposition (SVD) outputs of the channel matrix. For example, in cyclic single carrier systems, precoding can be performed in the frequency domain. The receiver can estimate the frequency domain channel matrices, perform SVD for the channel matrix on each subcarrier, then feed the unitary precoder of each subcarrier back to the transmitter. Various precoding schemes are known for reducing the feedback overhead.

Known approaches are disclosed, for example, in U.S. Pat. No. 8,165,241 B2, issued on Apr. 24, 2012, to Lin et al., entitled "Closed Loop Feedback in MIMO Systems"; 2. U.S. Pat. No. 7,961,802 B2, issued Jun. 14, 2011, to Li et al., entitled "Interpolation in Channel State Feedback"; and 3. U.S. Pat. No. 8,320,283 B2, issued on Nov. 27, 2012, to Kim, entitled "Method and System for Utilizing Givens Rotation Expressions for Asymmetric Beamforming Matrices in Explict Feedback Information. For a two transmit antenna scenario, the precoding schemes disclosed in these patents use two angles to represent the precoder and perform interpolation using an angular representation factoring out phase information (Lin), a Householder representation to reduce the dimensionality of the matrix (Li), or a Givens rotation representation to reduce the number of bits required to encode the unrotated matrix (Kim), for a two transmit antenna scenario.

A well-known LTE approach uses a codebook per subcarrier. An article by N. Khaled et al., entitled "Interpolation-based multi-mode precoding for MIMO-OFDM systems", Proc. EUSIPCO 2005, discloses linear interpolation of the entire matrix and normalization afterwards.

The present invention seeks to provide an improved or alternative method for reducing feedback overhead within fixed wireless backhaul networks comprising MIMO closed-loop systems, with particular application to two antenna systems.

SUMMARY OF INVENTION

Aspects of the present invention provide a method and apparatus for precoding, in two transmit antenna MIMO closed-loop systems, using feedback and interpolation.

Thus, one aspect of the present invention provides a method of precoding for a two transmit antenna Multiple Input Multiple Output (MIMO) system [per claim 1], comprising: A method of precoding in a two transmit antenna Multiple Input Multiple Output (MIMO) wireless network in a closed-loop system, the method comprising: at a receiver of a first wireless station, receiving a signal transmitted by two antennas of a transmitter of a second wireless station; determining a 2×2 precoding matrix from the received signal based on singular value decomposition (SVD); determining a first column of the 2×2 precoder matrix;

feeding back to the second wireless station the two complex entries of the first column of the 2×2 precoder matrix of at least one subcarrier using a finite precision format;

at a receiver of the second wireless station, receiving a signal comprising the values of the two complex entries of the first column of the 2×2 precoder matrix; interpolating from the received values the first column entries for every subcarrier using linear interpolation;

normalizing the sum of the absolute value squares of the first column entries of the precoder matrix, re-constructing the second column entries of the precoder matrix using negative conjugate and conjugate of the values of the first column entries; and applying the resulting precoder matrix to modulate data signals transmitted from the transmitter of the second station to the receiver of the first station.

The proposed method utilizes partial information of the precoder matrix, i.e., the first column of the matrix, and uses a novel reconstruction approach to reconstruct the 2×2 precoder based on the partial information of the precoder matrix, which provides reduced processing complexity and reduced feedback overhead compared with conventional known matrix representation methods.

In a preferred embodiment, the method comprises feeding back the first column of the unitary precoding matrix calculated from SVD. Linear interpolation is subsequently performed for the first column of the unitary precoding matrix. Then, for each subcarrier, the energy of the first column of the precoder matrix is normalized. The final step is to reconstruct the full unitary precoding matrix based on the first column of the precoder. This involves taking minus conjugate and conjugate for the entries in the first column.

That is, define the first column of the precoder matrix as f[k] for the kth subcarrier. We know that the optimal precoder F[k] can be constructed using the following formula:

$$f[k]=f[k]/\mathrm{norm}(f[k]);$$

$$F[k] = \begin{bmatrix} f[k,1] & -f[k,2]^* \\ f[k,2] & f[k,1]^* \end{bmatrix},$$

where f[k,1] and f[k,2] are the first and second entries of the column vector f[k] and * stands for conjugate operation.

In an alternative embodiment, the method may be performed on a per sub-band basis, using an average subcarrier such as a center subcarrier of each sub-band.

Other aspects of the invention provide is apparatus in a wireless network for performing steps of the method. Such apparatus may comprise a computer readable storage medium storing instructions, which when executed in a processor of a wireless transmitter or receiver, perform steps of the method for precoding.

Thus, a feedback reduction scheme and precoder interpolation strategy is provided for two transmit antenna systems. Instead, the method utilizes partial information of the precoder matrix, i.e., the first column of the matrix, and uses a novel reconstruction approach to reconstruct the 2×2 precoder based on the partial information of the precoder matrix. This approach does not incur significant loss in performance but has reduced feedback requirements and is much simpler to implement that the methods disclosed in the aforementioned references, such as those which use the Householder or Givens matrix representations.

The foregoing, and other objects, features, aspects and advantages of the present invention will become more apparent from the following detailed description, taken in conjunction with the accompanying drawings of preferred embodiments of the invention, which description is by way of example only.

BRIEF DESCRIPTION OF DRAWINGS

FIG. 5 shows a plot of Spectral Efficiency (bps/Hz) vs. Signal-to-Noise Ratio (dB), comparing simulation results for precoding using a method according to the embodiment with a method based on a conventional angular approach.

DETAILED DESCRIPTION

Figure 1:
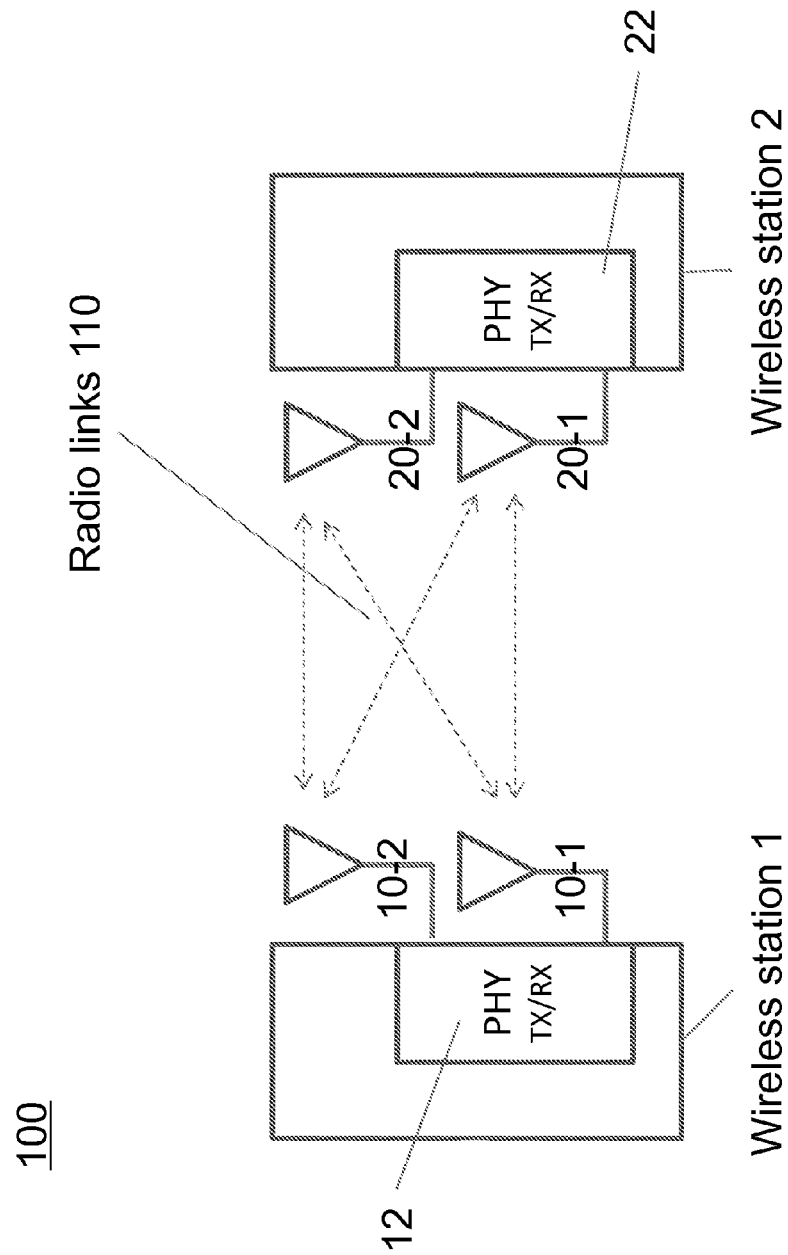
FIG. 1 shows a simplified schematic diagram representing part of a MIMO closed-loop system for implementing a method of precoding according to an embodiment of the present invention.

FIG. 1 shows a simplified schematic diagram representing part of a closed-loop MIMO wireless network 100 comprising first and second wireless stations, 1 and 2, each station having two antenna, 10-1, 10-2 and 20-1, 20-2, respectively. The physical layer 12, 22 (PHY) of each wireless station may comprise a transmitter TX and a receiver RX, i.e. an RF front end with signal processing and/or beamforming circuitry, which is coupled to a processing and control system of a high capacity data network.

For reference, elements of a typical multiple transmit antenna MIMO system are described in more detail in the above referenced Kim, Li and Lin patents, which disclose alternative precoding schemes which are more generally applicable to N×N multi-antenna systems.

Figure 2:
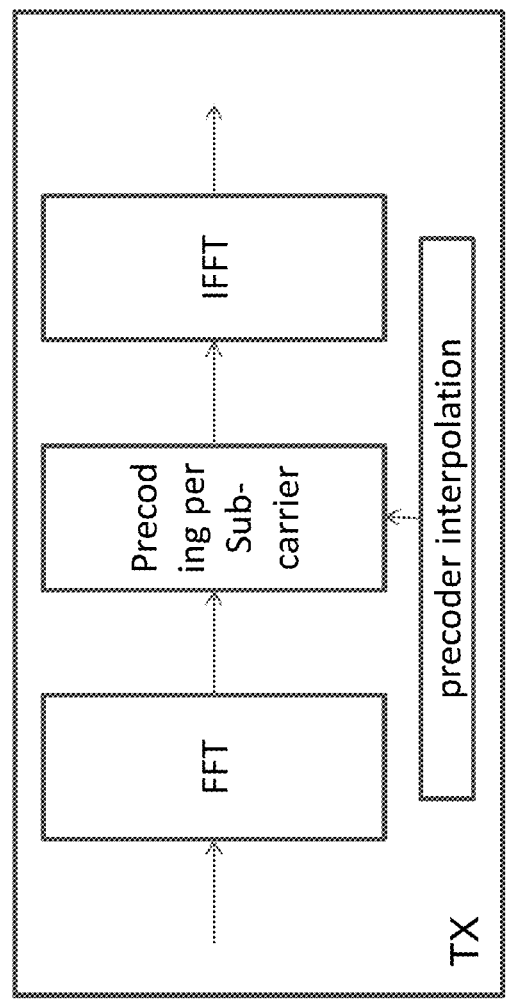
FIG. 2 represents schematically precoding functions performed by a receiver of the system.
Figure 3:
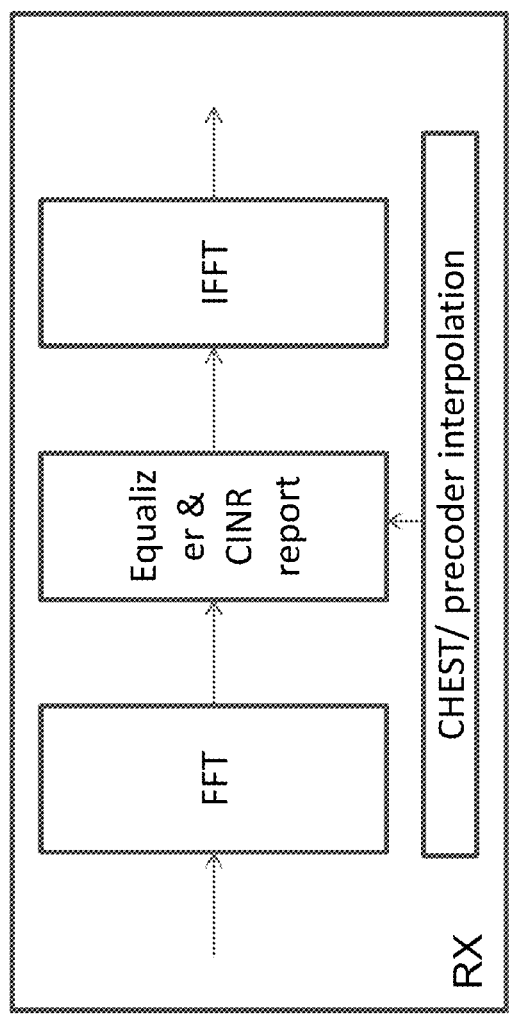
FIG. 3 represents schematically method steps for precoding functions performed by a transmitter of the system.

For a method of precoding according to an embodiment of the present invention, which is directed to a two transmit antenna system, FIG. 2 represents schematically precoding functions which are performed by PHY at a transmitter, and FIG. 3 represents schematically method steps for precoding functions which are performed by PHY at a receiver. As shown in FIG. 2, the PHY transmitter TX performs a precoder interpolation of received precoder information, to generate a precoder matrix, which is used for precoding per sub-carrier in the frequency domain. That is, the data signal undergoes a Fast Fourier Transform (FFT), is precoded using the precoder matrix H, then undergoes an inverse FFT (IFFT) for transmission of the data signal by the two transmit antenna. As shown in FIG. 3, to generate the precoder matrix, a receiver RX, receives a data signal, which undergoes FFT for equalization in the frequency domain. The receiver comprises a frequency domain equalizer and means for generating a CINR (Carrier to Interference and Noise Ratio) report. The receiver also performs the functions of channel estimation (CHEST) and precoder interpolation.

Figure 4:
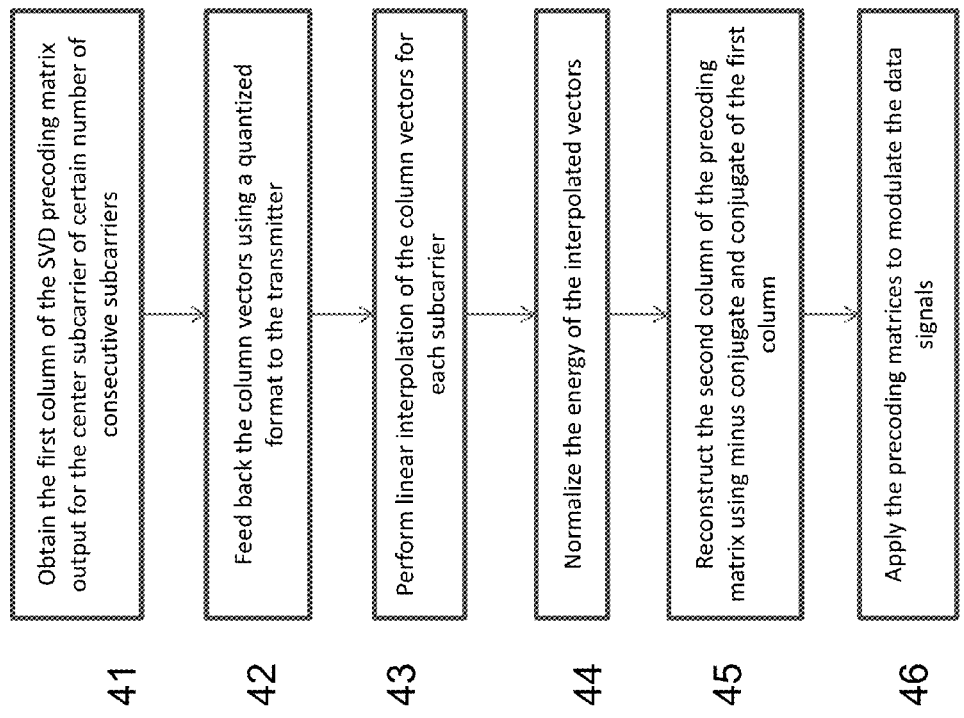
FIG. 4 shows a flow chart illustrating steps of a method for precoding, in a two transmit antenna Multiple Input Multiple Output (MIMO) system, according to an embodiment of the invention, comprising feedback and interpolation.

A flow chart 40 representing steps of the precoding method is shown in FIG. 4. At the receiver of a first wireless station (step 41), the first column of the SVD precoding matrix output for the center subcarrier of certain number of consecutive subcarriers is obtained. The column vectors are fed back to the second station using a quantized format (step 42). A linear interpolation of the column vectors for each subcarrier is performed (step 43). The energy of the interpolated vectors is normalized (step 44). The second column of the precoding matrix is reconstructed using minus conjugate and conjugate of the first column (step 45). The precoding matrix is applied to modulate the data signals transmitted from the transmitter of the first station to the receiver of the second station (step 46).

For the case where V is the optimal precoder:

$$[U,S,V]=SVD(H)$$

where H=MIMO channel, SVD=Singular Value Decomposition, S is a diagonal matrix, U & V are unitary matrices.

Define the first column of V[k] as f[k].

We know that the optimal precoder F[k] can be constructed using the following formula:

$$f[k] = \frac{\left(k - 16*\left\lfloor\frac{k}{16}\right\rfloor\right)f_{feedback}\left[\left\lfloor\frac{k}{16}\right\rfloor\right] + \left(16*\left\lfloor\frac{k}{16}\right\rfloor - k + 16\right)f_{feedback}\left[\left\lfloor\frac{k}{16}\right\rfloor + 1\right]}{16}$$

$$f[k]=f[k]/\text{norm}(f[k]);$$

$$F[k]=[f[k,1]-\text{conj}(f[k,2]); f[k,2], \text{conj}(f[k,1])].$$

In a preferred embodiment, precoding is performed for each channel. In an alternative embodiment, the precoder can be designed as a per-sub-band precoder using an average channel on each sub-band.

This method is applicable only to a 2×2 transmit antenna scenario. It cannot be readily generalized to an N×N scenario with N>2. Nevertheless, beneficially, the method provides low computational complexity for the interpolation, and lower feedback overhead compared to conventional known methods using other matrix representation methods.

By way of example, FIG. 5 shows a plot of Spectral Efficiency (SE [bps/Hz]) vs. Signal-to-Noise Ratio (SNR [dB]) comparing simulation results for precoding using a method according to the embodiment with a method based on a conventional angular approach. FIG. 5 shows results for A. the method according to the embodiment, which is labelled "Blinq approach" and B. a method based on a conventional "angular approach", which requires greater feedback overhead.

These results demonstrate that the method of the embodiment does not incur significant loss in performance but has reduced feedback requirements and is much simpler to implement.

Thus, the method disclosed herein provides reduced feedback overhead in MIMO two antenna wireless systems, applicable for fixed wireless backhaul networks.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method of precoding in a two transmit antenna Multiple Input Multiple Output (MIMO) fixed wireless backhaul network, the method comprising:
   at a receiver of a first wireless station: receiving a signal transmitted by two antennas of a transmitter of a second wireless station;
       determining a 2×2 precoding matrix from the received signal based on singular value decomposition (SVD);
       determining a first column of the 2×2 precoder matrix;
       feeding back to the second wireless station the two complex entries of the first column of the 2×2 precoder matrix of at least one subcarrier using a finite precision format;
   at a receiver of the second wireless station, receiving a signal comprising the values of the two complex entries of the first column of the 2×2 precoder matrix; interpolating from the received values the first column entries for every subcarrier using linear interpolation;
       normalizing the sum of the absolute value squares of the first column entries of the precoder matrix;
       re-constructing the second column entries of the precoder matrix using negative conjugate and conjugate of the values of the first column entries; and
       applying the resulting precoder matrix to modulate data signals transmitted from the transmitter of the second station to receiver of the first station.

2. The method of claim 1, wherein the subcarriers are the center subcarriers of each sub-band, comprising at least one subcarrier in a system.

3. Apparatus in a two transmit antenna Multiple Input Multiple Output (MIMO) fixed wireless backhaul network comprising:
   a plurality of wireless stations each comprising a receiver and a transmitter with two antenna,
   processing means in a receiver of a first wireless station configured to perform the method steps of:
       receiving a signal transmitted by two antennas of a transmitter of a second wireless station;
       determining a 2×2 precoding matrix from the received signal based on singular value decomposition (SVD);
       determining a first column of the 2×2 precoder matrix;
       feeding back to the second wireless station the two complex entries of the first column of the 2×2 precoder matrix of at least one subcarrier using a finite precision format;
   processing means in a receiver of a second wireless station configured to perform the method steps of:
       receiving a signal comprising the values of the two complex entries of the first column of the 2×2 precoder matrix;
       interpolating from the received values the first column entries for every subcarrier using linear interpolation;
       normalizing the sum of the absolute value squares of the first column entries of the precoder matrix;
       re-constructing the second column entries of the precoder matrix using minus conjugate and conjugate of the values of the first column entries; and
       applying the resulting precoder matrix to modulate data signals transmitted from the transmitter of the second station to receiver of the first station.

4. A wireless network according to claim 3, wherein the wireless stations comprise a plurality of hub modules and Remote Backhaul Modules (RBM), wherein each hub module serves a plurality of RBMs.

5. A non-transitory computer readable storage medium, storing instructions, which when executed by processor means of wireless stations of a two transmit antenna Multiple Input Multiple Output (MIMO) wireless network in a closed-loop system, perform the method steps of claim 1.

* * * * *